Feb. 22, 1966  J. H. MARTIN ETAL  3,237,066
CAPACITOR WITH ELECTRODES OF METAL COATED PARTICLES
Filed Feb. 25, 1963

INVENTORS
JACOB H. MARTIN
FRANKLIN D. FRANTZ JR.
BY
*Connolly and Hutz*
THEIR ATTORNEYS United States Patent Office 3,237,066
Patented Feb. 22, 1966

3,237,066
CAPACITOR WITH ELECTRODES OF METAL COATED PARTICLES
Jacob H. Martin, Williamstown, Mass., and Franklin D. Frantz, Jr., Woodford, Vt., assignors to Sprague Electric Company, North Adams, Mass., a corporation of Massachusetts
Filed Feb. 25, 1963, Ser. No. 260,630
3 Claims. (Cl. 317—258)

The present invention relates to electrical capacitors and more particularly to ceramic capacitors employing an improved electrode material.

In the formation of one type of ceramic capacitor a plurality of electrodes are separated by a ceramic dielectric. The electrodes originate from a metal paint, comprising powdered metal dispersed in a suitable vehicle. One commonly used paint is palladium powder dispersed in a volatile organic carrier liquid.

The use of this electrode material represents a considerable percentage of the cost of producing the units. Clearly any development resulting in a significant reduction of this expense, without sacrificing the excellent properties of this material, would constitute an extremely practical advance in the art.

It is an object of the instant invention to present a novel electrical capacitor which is superior to its prior art counterpart.

Another object is to manufacture such a capacitor in a more economical and efficient manner than heretofore.

Still another object is to provide a comparatively inexpensive palladium electrode capacitor.

Yet another object is to present a ceramic capacitor having an excellent bond between the ceramic and the palladium electrode.

Other objects and advantages of the present invention will be made obvious to those skilled in the art by the following description when considered in relation to the accompanying drawing, of which:

Figure 1:
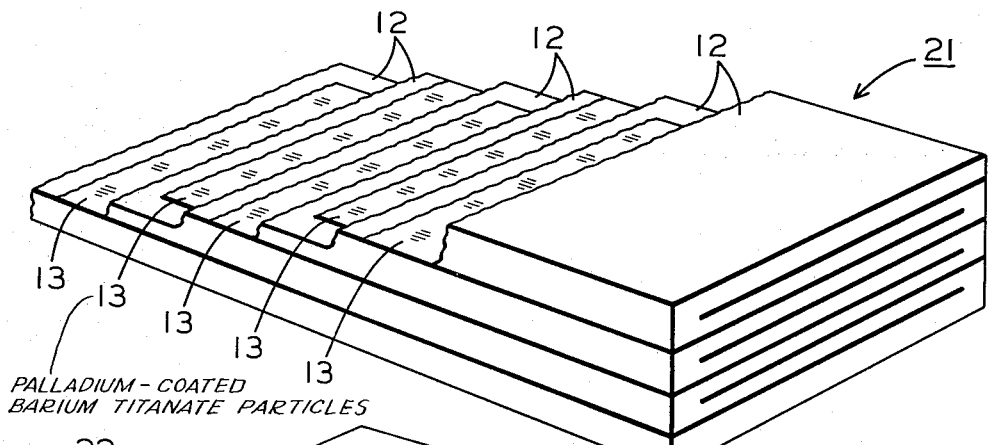
FIGURE 1 is a perspective view partly broken of a build-up of alternate layers of dielectric and staggered electrodes.

In general the above objects are achieved by forming a capacitor having electrodes which originated from an electrode paint comprising an organic vehicle having dispersed therein non-metallic particles at least partially coated with palladium.

The obvious advantage gained by such an innovation is a savings of at least 25% in the cost of electrode material. In addition, several unexpected advantages resulted from the formation and use of the electrode material. By limiting the size of the non-metallic particles to about 2.0 microns or less the final metal-plated particles were surprisingly uniform. This yields a greater surface area per unit weight of electrode metal. The capacitance of the subject capacitors averages at least 10% more than the same capacitors employing a commercial palladium electrode paint. It has also been observed that there is less tendency for the electrode to delaminate from the ceramic dielectric.

The electrode material employed herein is formed in the following manner:

EXAMPLE

Step I.—Formation of the palladoso tetramine complex

Heat 2000 ml. of an aqueous $PdCl_2$ solution, containing 100 gms. of palladium to 80° C. Add ammonia to this solution until the flesh-colored palladoso diamino complex is precipitated. Add a further amount of ammonia until the precipitate redissolves yielding the soluble palladoso tetramine complex. The total amount of ammonia is about 750 ml.

Step II.—Sensitization of the ceramic particles 46 gms. of a pre-fired barium titanate ceramic of 2 micron particle size are suspended in 300 ml. of $H_2O$. 25 ml. of a 1% stannous chloride solution are added slowly with stirring to the suspension. 20 ml. of a dilute $PdCl_2$ solution (1 gm. per liter) is added slowly with agitation. Enough water is evaporated to form a paste.

Step III.—Palladium plating of the ceramic particles 2000 ml. of $H_2O$ are heated to 50° C. 350 ml. of concentrated ammonia, 20 ml. of a 10% aqueous solution of hydrazine and 10 gms. of the disodium salt of ethylenediaminetetracetic acid are added to the heated water. One third of the sensitized ceramic paste of Step II is then dispersed in this solution. The 2750 ml. of the palladoso tetramine complex solution of Step I is added in 250 ml. increments with stirring. Concurrently for every 250 ml. of solution added, 25 ml. of a 10% aqueous solution of hydrazine is added. After 900 ml. of the complex solution has been added another third of the ceramic paste is added and after 1800 ml. of the complex solution has been added the final third of paste is added. By the time the addition is complete the bath is colorless and fine grey particles have settled out. This material is separated from the supernatant liquid, washed and dried.

Uniformly plated ceramic particles, having a palladium:ceramic weight ratio of about 37:17, results from this process. This offers a volume ratio of about 1:1 palladium to ceramic, which has been found to be optimum for the present purpose. The particle size distribution has been determined to be approximately 90% in the 5–10 micron range, 9% in the 1–5 micron range and 1% in the 10–15 micron range.

The dried powder is dispersed in a suitable vehicle or organic binder to form the electrode paint. For example, equal weights of the powder and an ethyl-cellulose-terpineol mixture were throughly blended to form the paint.

Figure 2:
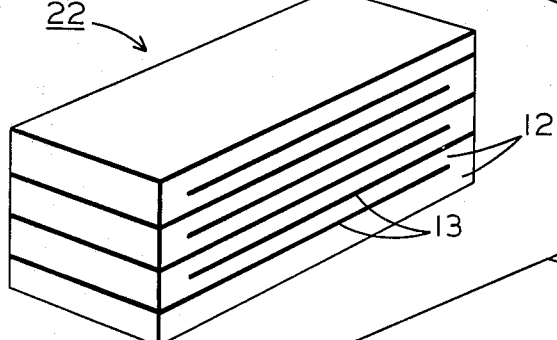
FIGURE 2 is a perspective view of a capacitor chip cut from the build-up of FIGURE 1.
Figure 3:
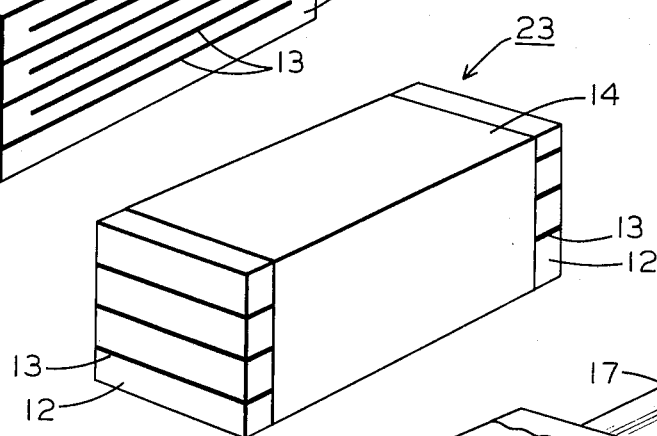
FIGURE 3 is a perspective view of the capacitor chip of FIGURE 2 with a dielectric coating over the cooperating electrodes.
Figure 4:
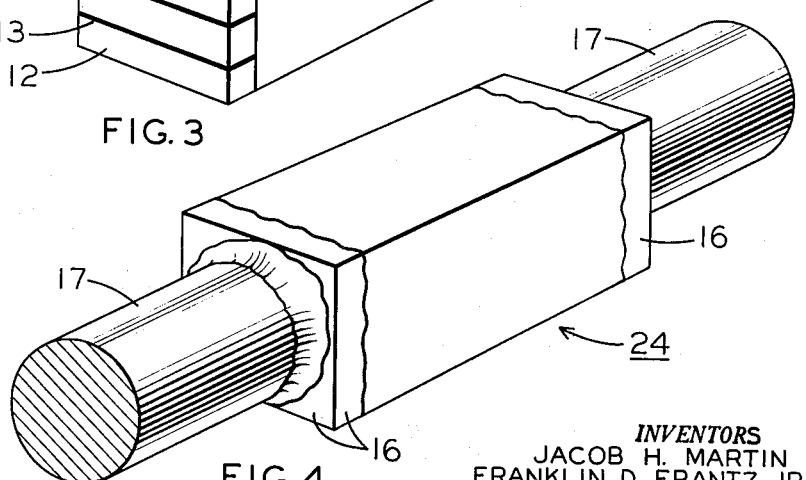
FIGURE 4 is a perspective view of the completed capacitor with leads attached.

Referring to the drawings which illustrate an embodiment of the invention, FIGURE 1 shows a build-up 21 of alternate layers of a barium titanate dielectric 12 (the same titanate as employed above) and staggered electrodes 13. This build-up 21 has been cut or diced to form individual capacitor chips 22 as shown in FIGURE 2. These individual units or chips are then coated with a dielectric material over the central portion thereof to cover the edges of the cooperating electrodes exposed by said cutting or dicing as shown at 14 in FIGURE 3. The units or chips are then fired to maturity. Thereafter, the electrode ends of the individual capacitor units are exposed by grinding or abrading to remove any dielectric covering said electrodes. To each end there is applied an electrode pick-up 16 to afford electrical communication between the electrodes and to which are affixed leads 17 to complete the capacitor 24 as shown in FIGURE 4.

Although palladium is the preferred electrode metal, other platinum group metals may also be employed.

The non-metallic particles which constitute the nucleation sites for the palladium, preferably are of the same material as the dielectric. This will tend to minimize the difference in thermal expansion between the dielectric and the electrode material. The preferred material is barium titanate per se or the same containing any of the prior art additives used to improve the characteristics of the dielectric. It is to be understood, however, that other materials, such as alumina, silica, carbon in its various forms, titania, etc. may be employed. It is believed that any non-metallic material, capable of being subdivided to an average particle size of about 2 microns and sensitized to act as a nucleation site is contemplated herein.

A special group of materials within the broad class of non-metallic particles offer advantages which would not be gained by the use of the remainder of the class. This material is generally termed semiconducting material. The material may be an extrinsic semiconductor or an intrinsic semiconductor. The extrinsic semiconductor will have a cation or anion deficiency, e.g. reduced barium titanate, barium titanate doped with lanthanum. Examples of an intrinsic semiconductor are silicon, germanium, etc. In short, any semiconducting material which will act as the nucleation site for the palladium and still retain its semiconducting properties is contemplated. Whichever type of semiconducting material is selected, the procedure is the same as with the non-semiconducting, non-metallic material.

The preferred semiconducting material is the barium titanate employed in the above example, but which has been reduced in a reducing atmosphere. After this material has been sub-divided to an average particle size of about 2 microns and coated with palladium, as in the above example, there is no danger that the barium titanate will be reoxidized during subsequent firing steps performed in forming the capacitors. Palladium is impervious to all gases except hydrogen and thus the semiconducting particles have a protective shell excluding oxygen.

As a result of employing a semiconducting material as the nucleus of the palladium coated particles, the electrodes formed therefrom are certain to be electrically continuous as long as there is contact between the plated particles. There is also reason to believe that the palladium shell adheres tenaciously to the surface of the particles even during comparatively severe milling of the material into a paint vehicle.

The completed capacitor units may be coated with any resin material, for example, the phenolics, for electrical insulation of the metallic parts and for mechanical uniformity.

It is also contemplated that the electrode material may be employed in capacitors having two dissimilar electrodes separated by a dielectric. For example, the palladium electrode material of the present invention can be applied to a barium titanate body, the unit fired in air, then reduced in a reducing atmosphere, a silver electrode applied and fired on in an oxidizing atmosphere. In the resulting unit the surface of the body adjacent to the silver counterelectrode is in an oxidized state and the body adjacent to the palladium electrode is in a reduced state.

The dielectric material contemplated herein can be any of the commonly used titanates, for example, the alkaline earth metal titanates with or without prior art additives. Dielectric vitreous enamel may also be used.

As is evident from the foregoing, the invention is not to be limited to formation of the rather specific illustrative device. Modifications and variations, as well as the substitution of equivalents may be made without departing from the spirit of the invention as defined in the appended claims.

What is claimed is:

1. A ceramic capacitor comprising a ceramic barium titanate dielectric separating a plurality of cooperating, alternately disposed electrodes, said electrodes consisting essentially of small size barium titanate particles at least partially coated with palladium.

2. A ceramic capacitor comprising a barium titanate dielectric separating a plurality of cooperating, alternately disposed electrodes, said electrodes consisting essentially of barium titanate particles coated with palladium, said particles averaging about 2 microns in size.

3. The ceramic capacitor of claim 2 wherein the palladium-coated barium titanate is a reduced barium titanate having semiconducting properties.

References Cited by the Examiner

UNITED STATES PATENTS

| 2,633,543 | 3/1953 | Howatt. | |
|---|---|---|---|
| 2,743,196 | 4/1956 | Robinson | 117—227 |
| 2,841,508 | 7/1958 | Roup | 317—258 |
| 2,899,345 | 8/1959 | Oshry | 317—258 |
| 2,946,937 | 7/1960 | Horton | 317—258 |
| 3,031,344 | 4/1962 | Sher | 117—100 |
| 3,086,150 | 4/1963 | Held | 317—261 X |

FOREIGN PATENTS 827,016  1/1960  Great Britain.

JOHN F. BURNS, *Primary Examiner.*